Patented Nov. 13, 1951

2,574,620

UNITED STATES PATENT OFFICE 2,574,620

BETA-DI-PIPERONYL-AMINO-ETHANOL-HYDROCHLORIDE

Sven Carlsson, Abrahamsberg, Sweden, assignor to Aktiebolaget Recip, Stockholm, Sweden No Drawing. Application April 13, 1949, Serial No. 87,376. In Sweden April 30, 1948

2 Claims. (Cl. 260—338)

This invention relates to amino-alcohols, their salts and methods of making the same.

It is an object of the invention to provide a new class of amino alcohols and their salts as well as methods of making the same, the novel compounds being distinguished by excellent spasmolytic properties.

The general formula of the new amino-alcohols is

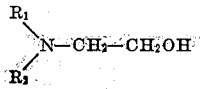

wherein $R_1$ is

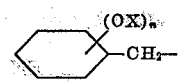

X being hydrogen or an alkyl group with from 1 to 6 C atoms and $n$ being an integar between 1 and 5, and $R_2$ is hydrogen, alkyl, aryl, aralkyl or a group of the same type as $R_1$. In cases in which $n$ is greater than 1, X may be a —$(CH_2)_m$— group forming a bridge between two oxygen atoms bound to the phenyl radical, $m$ being an integer between 1 and 6.

Those of the new compounds wherein $R_1$ is a piperonyl group, are especially effective for spasmolytic purposes. In this case, preferably, $R_2$ may be an aralkyl radical such as a benzyl or piperonyl radical.

The anisyl and vanillyl compounds corresponding to the above-mentioned piperonyl compounds have properties very similar to those of the piperonyl compounds.

The invention embraces not only the new amino alcohols proper but likewise their salts, which have the same favorable spasmolytic properties as the alcohols. Particularly valuable are such salts as e. g. the hydrochloride, hydrobromide, formiate, acetate, propionate, sulfate, phosphate, nitrate etc., the acid component of which has no harmful physiological effect.

The invention further comprises methods of making the new amino alcohols, either by introducing one or more

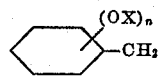

groups into an amino alcohol of the general formula

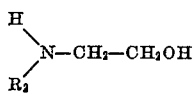

wherein X, $R_2$ and $n$ have the same significance as outlined above, or by reacting an amine of the general formula

wherein $R_1$ and $R_2$ have the same significance as explained above, with ethylene chlorohydrin or ethylene oxide.

According to the first of the above-mentioned methods of synthesizing the compounds of the invention, a halogenide, and particularly a chloride, of the formula

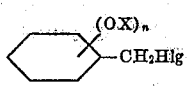

may be reacted with an amino alcohol of the formula

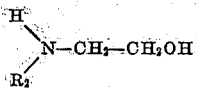

If the amino alcohol employed is $H_2NCH_2CH_2OH$, two or one mol of the halogenide may be reacted with one mol of the amino alcohol; if only one mol of the halogenide is reacted with the amino alcohol, one of the hydrogen atoms attached to the nitrogen remains unsubstituted; it may be substituted in a subsequent stage by an alkyl, aryl or aralkyl radical, in any known manner.

Another method of introducing the

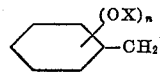

group involves reacting an aldehyde of the general formula

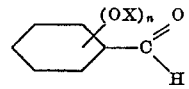

with an amino alcohol of the formula

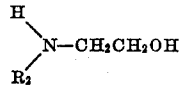

in the presence of a reducing agent. If the amino alcohol employed is $H_2NCH_2CH_2OH$, two or one mol of the aldehyde may be reacted with one mol of the amino alcohol; if only one mol of the aldehyde is reacted with the amino alcohol, one of the hydrogen atoms attached to the nitrogen remains unsubstituted; it may be substituted in a subsequent stage by an alkyl, aryl or aralkyl radical, in any known manner.

A reducing agent which may be used to advantage in the substitution reaction, conjointly with an aldehyde of the type indicated above, is formic acid.

If the synthesizing reaction is carried out in a solution containing an acid, the salt of the said acid with the new amino alcohol is formed immediately. In other instances where one wishes to obtain a salt of the amino alcohol, an acid may be added after completion of the synthesis.

The following examples illustrate the present invention which, however, is not limited thereto.

Example 1

61 g. beta-amino-ethanol, 100 g. formic acid of 98% concentration and 150 g. piperonal are heated together to a temperature of 150° C. When the development of carbon dioxide has nearly ceased, 150 g. piperonal and 50 g. formic acid are added, whereafter the mixture is heated to 200° C. After one hour the mixture is allowed to cool and an additional amount of 50 g. formic acid is added. The mixture is then heated to 200° C for another hour. The mixture is cooled and NaOH is added in an amount sufficient to render the reaction alkaline. The oily layer is dissolved in ether and filtered. A quantity of absolute alcohol corresponding to the volume of the etherical solution is added. Concentrated HCl is added until a weak acid reaction is obtained whereby di-piperonyl-beta-amino-ethanol-hydrochloride is precipitated. The melting point of the crude compound is 201° C., and the melting point of the purified compound is 208° C.

Example 2

15.1 g. N-mono-benzyl-beta-amino-ethanol and 17 g. piperonyl-chloride are mixed. The mixture is slowly heated to 120° C. After cooling, 50 ml. water are added and the solution is extracted with ether. Thereafter so much of a strong base is added that the reaction is rendered alkaline; the alkaline solution is extracted with ethylalcohol dissolving the N-piperonyl-N-benzyl-beta-amino-ethanol. After the evaporation of the ether the base is obtained as oil. By addition of HCl, the corresponding hydrochloride is formed which is highly soluble in water and thus cannot be obtained in crystallized form.

Example 3

28.5 g. di-piperonyl-amine is mixed with 8 g. ethylene chlorohydrin. The mixture is slowly heated to 120° C. The di-piperonyl-beta-amino-ethanol-hydrochloride thus produced is isolated in the manner described in Example 1.

Example 4

285 g. di-piperonyl-amine is introduced into an autoclave, which is then evacuated and heated to 100° C. Thereafter 44 g. ethylene oxide are introduced under pressure. After cooling the reaction product is neutralized with HCl whereupon crystallized di-piperonyl-beta-amino-ethanol-hydrochloride is precipitated.

I wish it to be understood that I do not desire to be limited to the details of the invention as described above as various modifications within the scope of the appended claims may occur to a person skilled in the art which would involve no departure from the spirit of the invention nor any sacrifice in the advantage thereof.

I claim:

1. Beta - di-piperonyl-amino-ethanol-hydrochloride.

2. The method of producing beta-di-piperonyl-amino-ethanol-hydrochloride, which comprises reacting two mols of piperonal with one mol of beta-amino-ethanol, in the presence of formic acid, and adding hydrochloric acid to the reaction product.

SVEN CARLSSON.

REFERENCES CITED

The following references are of record in the file of this patent:

UNITED STATES PATENTS

| Number | Name | Date |
| --- | --- | --- |
| 1,073,966 | Decker | Sept. 23, 1913 |
| 2,114,122 | Bruson | Apr. 12, 1938 |
| 2,527,527 | Buck | Oct. 31, 1950 |